United States Patent [19]

Takekado

[11] Patent Number: 4,892,174

[45] Date of Patent: Jan. 9, 1990

[54] NUTATION DAMPER FOR A HIGH-SPEED SPINNING BODY

[75] Inventor: Shigeru Takekado, Tokyo, Japan

[73] Assignee: Kabushiki Kaisha Toshiba, Kawasaki, Japan

[21] Appl. No.: 222,288

[22] Filed: Jul. 21, 1988

Related U.S. Application Data

[63] Continuation of Ser. No. 26,195, Mar. 16, 1987, abandoned.

[30] Foreign Application Priority Data

Mar. 20, 1986 [JP] Japan .................................. 61-63216

[51] Int. Cl.[4] ................................................ F16F 15/16

[52] U.S. Cl. ..................................... 188/378; 188/268; 74/574

[58] Field of Search .................... 74/574; 188/268, 378

[56] References Cited

U.S. PATENT DOCUMENTS

| | | | |
|---|---|---|---|
| 2,403,478 | 7/1946 | Burnat | 74/574 |
| 3,716,206 | 2/1973 | Lynch et al. | 74/574 X |

FOREIGN PATENT DOCUMENTS

| | | | |
|---|---|---|---|
| 0140941 | 8/1982 | Japan | 188/378 |
| 1303813 | 1/1973 | United Kingdom | 74/574 |
| 2100388 | 12/1982 | United Kingdom | 74/574 |

OTHER PUBLICATIONS

Ehrich, F. F. (1967), The Influence of Trapper Fluids on High Speed Rotor Vibration, *Trans. ASME.,* vol. 89, Ser. B, No. 4, pp. 806–812.

Wolf, J. A. Jr., (1968), Whirl Dynamics of a Rotor Partially Filled with Liquid, *Trans. ASME.,* vol. 35, Ser. E, No. 4, pp. 676–682.

*Primary Examiner*—Andres Kashnikow

*Assistant Examiner*—Richard Potosnak

*Attorney, Agent, or Firm*—Oblon, Spivak, McClelland, Maier & Neustadt

[57] ABSTRACT

The present invention provides a nutation damper having a hollow ring-shaped container installed concentrically to the axis of spin of a spinning body, with a viscous fluid sealed inside, and partially filling the container so as to leave a gap. The volume of the viscous fluid is determined as less than or equal to ½ of the volume enclosed by the outer wall of the container. It can provide a nutation damper of simple construction which can damp nutation arising in high-speed spinning bodies and allow these spinning bodies to spin stably.

9 Claims, 3 Drawing Sheets

NUTATION DAMPER FOR A HIGH-SPEED SPINNING BODY

This application is a continuation of application Ser. No. 026,195, filed Mar. 16, 1987, now abandoned.

BACKGROUND OF THE INVENTION

1. Field of the Invention

This invention concerns a nutation damper which exerts a damping force on the nutation of high-speed spinning bodies such as flywheels used in magnetic bearings and gyroscopes.

2. Discussion of Background

Although flywheels (reaction wheels) and gyroscopes are generally used for attitude control of satellites, an intrinsic oscillation called nutation occurs in this type of high-speed spinning body due to the gyro effect. This nutation is manifested as a wobbling of the spin axis of the spinning body. If the speed of spin of the spinning body is taken as $f_s$, the moment of inertia of the spinning body about the spin axis is taken as $I_p$ and the moment of inertia of the spinning body about an axis orthogonal to the spin axis is taken as $I_d$, the frequency of nutation $f_n$ is $$f_n=(I_p/I_d)f_s$$

And, in high-speed flywheels and gyroscopes which can direct the spin axis to any given direction the, damping force for nutation occurring due to external disturbance is extremely small. Thus nutation cannot converge and waddling about the spin axis occurs. For this reason, in the case of satellites which use high-speed spinning bodies for attitude control, there was the disadvantage that a slow motion was caused or the immobility of the gyroscope was impaired.

When the speed of spin of the spinning body is small there is hardly any problem with the nutation described above but, as the spin speed of the spinning body becomes greater, the problem becomes more serious. In the case of prior flywheels and gyroscopes, almost no consideration was given to nutation, but as the speed of spinning bodies has become greater, counter-measures for nutation have become important.

OBJECT OF THE INVENTION

It is an object of the present invention to provide a nutation damper of simple construction which can damp nutation arising in high-speed spinning bodies and allow these spinning bodies to spin stably.

SUMMARY OF THE INVENTION

To accomplish the objects of the present invention, it provides a nutation damper having a hollow ring-shaped container installed concentrically to the axis of spin of a spinning body, with a viscous fluid sealed inside the container to leave a gap. The volume of the viscous fluid is determined as less than or equal to ½ of the volume enclosed by the outer wall of the container.

Consequently, when the spinning body spins, the viscous fluid in the container rises around the outer wall of the container due to centrifugal force and a wave, called the centrifugal wave, is generated in the viscous fluid in the same direction as the direction of spin. If the frequency of this centrifugal wave and the nutation frequency of the spinning body are set almost equal, the nutation energy will be damped by absorption in the centrifugal wave. Therefore, the nutation can be damped and the spinning body can be spun in a stable condition. Moreover, the above function can be accomplished with the simple construction of merely sealing the fluid into the container. Furthermore, by making the volume of the viscous fluid less than or equal to ½ of the volume enclosed by the outer wall of the container, the instability of the spinning body is not increased by the presence of the viscous fluid in the container, and the pressure of the viscous fluid will not become excessive when spinning, thus preventing the danger of a blow-out of the viscous fluid.

This invention has the following excellent effects. As explained above, when using the nutation damper of this invention, nutation of flywheel and gyroscope spinning bodies can be damped and stability of the spinning bodies can be increased. Also, the damper of this invention comprises only viscous fluid sealed inside a hollow ring-shaped container and its construction is therefore simple, and its reliability is great because there is little to go wrong. Furthermore, since the volumetric ratio of the viscous fluid sealed into the container of this invention is less than 0.5, sufficient damping characteristic can be obtained while at the same time self-exciting oscillation of the viscous fluid itself can be prevented and, moreover, the risk of the fluid blowing out due to excessive pressure of the viscous fluid while spinning can be reduced.

DETAILED DESCRIPTION OF THE PREFERRED EMBODIMENTS

Figure 1:
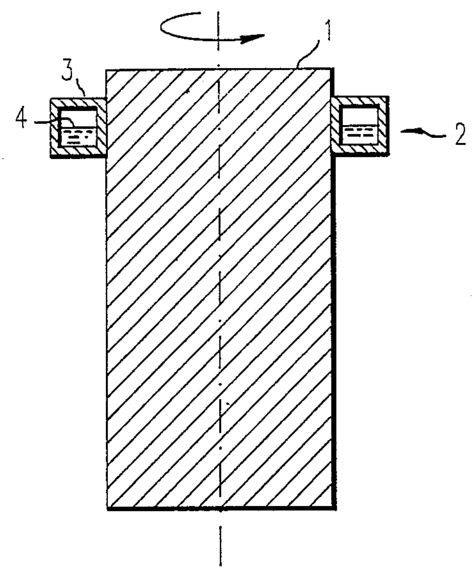
FIG. 1 is a local vertical cross-section of a spinning body incorporating the nutation damper related to an embodiment of this invention.
Figure 2:
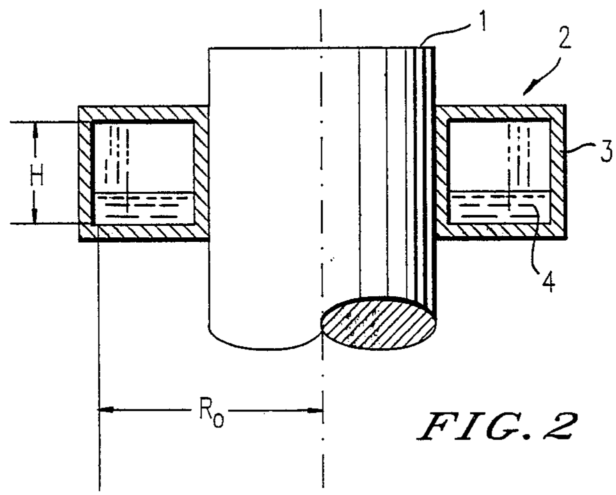
FIG.2 is a vertical cross-section showing an enlargement of a section of a nutation damper only.

An embodiment of this invention is explained below with reference to FIGS. 1 and 2. 1 in the Figures is the high-speed spinning body. Incidentally, the driving motor section is omitted from these drawings.

Nutation damper 2 related to this invention is installed on high-speed spinning body 1. This nutation damper 2 is constructed from a hollow ring-shaped container 3 of rectangular cross-section installed on the periphery of, and concentrically to the axis of spin of, high-speed spinning body 1, and a viscous fluid 4 is sealed inside, and partly fills, the container so as to leave a gap.

The volumetric ratio $\alpha=V_l/V$ between the volume $V_l$ of the sealed viscous fluid and the volume V enclosed by the outer wall of container 3 is set in the region of, for example, less than or equal to 0.5. Volume V in this case is that volume obtained by $$V=\pi R_o^2H$$

when the distance from the outer wall of container 3 to the spin axis of high-speed spinning body 1, that is to say.

the spin radius, is taken as $R_o$ and the height of the outer wall is taken as H.

A fluid with a viscosity of more than or equal to 1.0 cSt, and preferably at least 10 cSt, and with little fluctuation of viscosity with temperature is desirable as viscous fluid 4. As viscous fluids 4 which satisfy these conditions, silicone oil liquids such as methyl silicone are desirable. This type of liquid has little fluctuation of viscosity with temperature change and can be used in a wide temperature range of −50° C.∼180° C., and therefore has great resistance to both heat and cold. Moreover, they are chemically stable, do not attack other substances, and are cost-effective. Such fluorinated oil liquids as perfluoro polyether, perfluoroalkyl polyether and ethylene chloride trifluoride are suitable as viscous fluids 4. Since, as well as having the same advantages as silicone oils, these fluids have specific gravities which are about 2 times greater than silicone oils, they contribute to miniaturisation of the nutation dampers. Moreover, since they are stable under irradiation by radioactive rays and do not form sludge and the like, they are suitable for use in such space equipment as satellite attitude control flywheels and gyroscopes.

Next the operation of this embodiment is explained. First, when high-speed spinning body 1 spins, viscous fluid 4 in container 3 rises along the outer wall of container 3 due to centrifugal force, as shown by the broken lines in FIG. 2. With viscous fluid 4 in this state, there is a free surface along the inner wall. In this state, a wave, called the centrifugal wave, is generated in the fluid in the same direction as the direction of spin. When the volumetric ratio of viscous fluid 4 is taken as $\alpha$ and the speed of spin of high-speed spinning body 1 is taken as $f_s$, the frequency $f_\omega$ of this centrifugal wave is $$f_\omega=\{(2+\sqrt{2\alpha})/(2-\alpha)\}\cdot f_s$$

Thus, when the frequency $f_\omega$ of the centrifugal wave matches the frequency $f_n$ of the nutation wave mentioned above, the nutation energy is absorbed by the centrifugal wave so that the nutation is damped. The frequency of the centrifugal wave can be set at a specified value by adjusting the volumetric ratio $\alpha$ of viscous fluid 4. In this case, the nutation frequency $f_n$ of the spinning body is $f_n=2f_s$ for a disc or a ring and is $f_n=f_s$ for a sphere and, generally, in the case of such configurations as flywheels and gyroscopes, it will be less than $2f_s$. Consequently, a value less than or equal to 0.5 will be sufficient for $\alpha$. Conversely, if $\alpha$ is too large, the viscous fluid mass will be large and the stability of the spinning body will be impaired. Also, when the specific gravity of the fluid is taken as $\rho$ and the angular velocity of the spinning body is taken as $\omega(=2\pi f_s)$, the pressure P in the viscous fluid while spinning is, $$P=\frac{1}{2}\rho\omega^2R_o^2\alpha$$

If the volume of the viscous fluid is too large, the load acting on the outer wall of the container will be too great and the danger of the viscous fluid blowing out while spinning becomes greater. Therefore, a value less than or equal to 0.5 is desirable for $\alpha$ in the above case.

Next, if the viscosity of the viscous fluid is too small, not only will the nutation damping effect be insufficient, but there is a risk of self-exciting oscillation occuring in the viscous fluid itself. Therefore, a viscosity of more than or equal to 1.0 cSt (cSt=centistoke: CGS unit of kinematic viscosity) is desirable for the viscous fluid, as mentioned above. The use of mercury or water as the viscous fluid is not desirable from this point of view.

Figure 3:
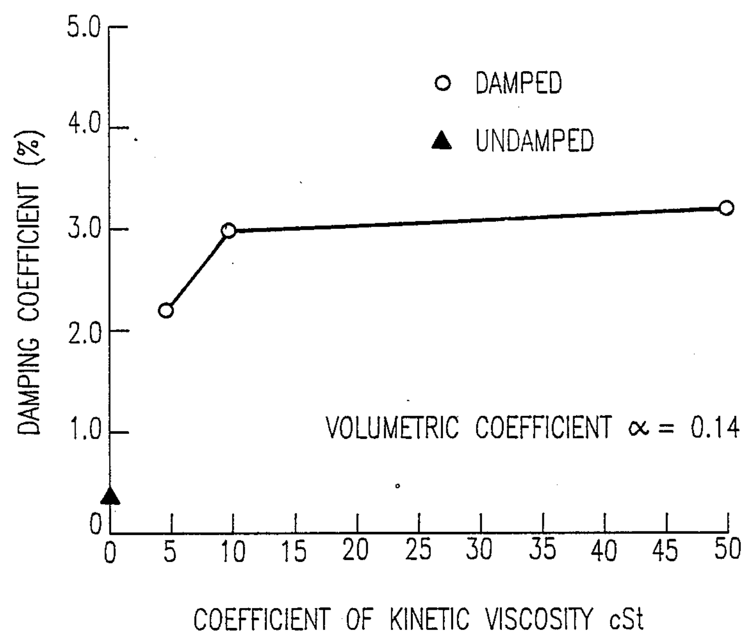
FIG. 3 is a graph showing the relationship between the viscosity of the viscous fluid and the damping charcteristic.

Here, the results of an experiment on the relationship between the viscosity of viscous fluid 4 and the nutation damping effect are explained. First, a nutation damper with a viscous fluid volumetric coefficient of $\alpha=0.14$ for a high-speed spinning body of $f_n/f_s=1.4$ was made. The results shown in FIG. 3 were obtained by carrying out an experiment on the damping characteristic by varying the viscosity of the viscous fluid sealed inside the nutation damper. As is clear from these results, the higher the viscosity, the greater the damping characteristic.

Figure 4A:
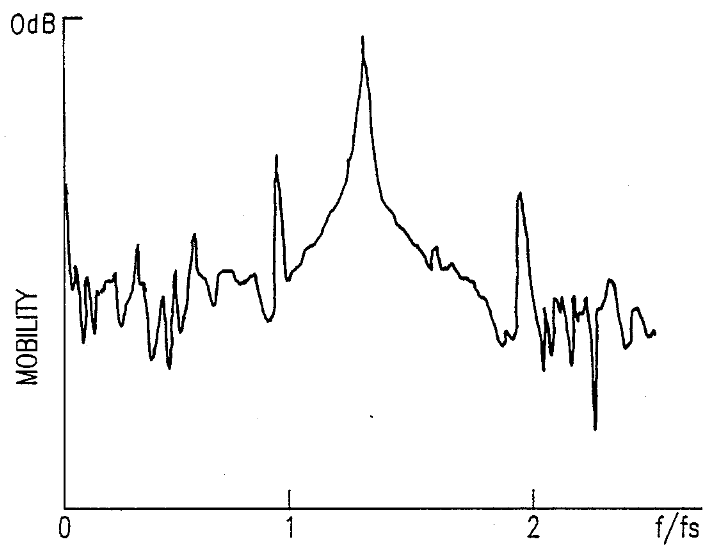
FIGS. 4(*a*) and (*b*) are graphs showing the damping effect of a nutation damper of this invention.
Figure 4B:
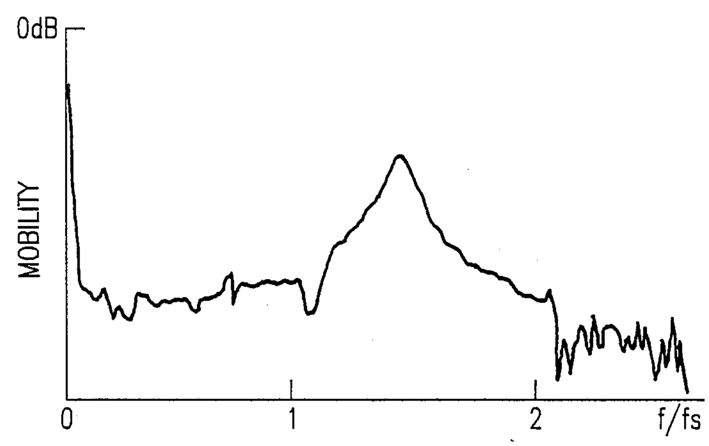

FIG. 4 shows the results of an experiment on the effect of this nutation damper. In this case, the viscosity of the viscous fluid was 50 cSt. FIG. 4(*a*) shows the case without the nutation damper fitted. FIG. 4(*b*) shows the case when the nutation damper was installed. As is clear from these results, the maximum value of nutation was reduced by as much as 17 dB using the nutation damper of this invention, and damping of almost 7 times was obtained.

Figure 5:
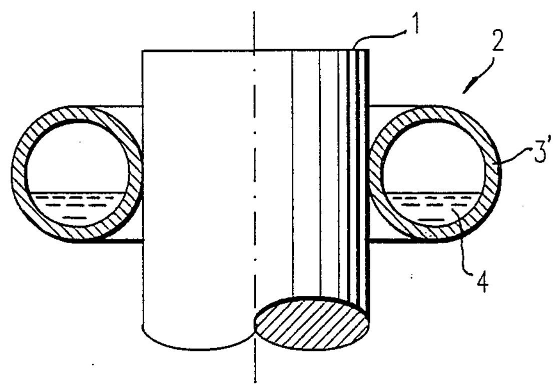
FIG. 5 is a vertical cross-section of a nutation damper in another embodiment of this invention.

Incidentally, this invention is not confined to the above-mentioned embodiment. Another embodiment of this invention is shown in FIG. 5. In this embodiment container 3' has a circular cross-section, but otherwise the construction is the same as in the embodiment mentioned above. In the case of this embodiment, construction is simple and all that is required is to bend a circular cross-section pipe into a ring and weld the ends.

Furthermore, this invention is not confined to the above-mentioned embodiment, nor is the cross-section of this container confined to a circular shape but may be of any other shape.

Again, although it is desirable to form the inside of the container smoothly so that the flow of the viscous fluid is not subjected to resistance, some irregularity or unevenness, variation in cross-section, etc, may be permitted.

What is claimed is:

1. A nutation damper for a high-speed spinning body comprising:

a hollow ring-shaped container installed concentrically to the axis of spin of a high-speed spinning body and rotating therewith, and a viscous liquid fluid sealed inside, and partially filling, the container so as to leave a gap, said viscous fluid having a volume which is determined as less than or equal to ½ of the volume enclosed by the outer wall of said container, said container containing only said viscous liquid fluid, except for said gap.

wherein said viscous fluid has a viscosity of more than or equal to 1.0 cSt with little fluctuation of viscosity with temperature and is one from the group consisting of a silicone oil and a fluorinated oil, whereby a circumferential wave is formed in said viscous fluid during rotation of said spinning body and nutation energy is damped by said centrifugal wave when the centrifugal wave frequency matches the nutation frequency.

2. The nutation damper according to claim 1 wherein said viscous fluid is a silicone oil liquid having a viscosity of more than or equal to 1.0 cSt.

3. The nutation damper according to claim 2 wherein said silicone oil liquid is methyl silicone.

4. The nutation damper according to claim 1 wherein said viscous fluid is a fluorinated oil liquid.

5. A nutation damper according to claim 4 wherein said fluorinated oil liquid is perfluoro polyether.

6. The nutation damper according to claim 4 wherein said fluorinated oil liquid is perfluoroalkyl polyether.

7. The nutation damper according to claim 4 wherein said fluorinated oil liquid is ethylene chloride trifluoride.

8. A nutation damper for a high-speed spinning body comprising:

a hollow ring-shaped container installed concentrically to the axis of spin of a high-speed spinning body and rotating therewith, and a viscous liquid fluid sealed inside, and partially filling, the container so as to leave a gap, said viscous fluid having a volume which is determined as less than or equal to ½ of the volume enclosed by the outer wall of said container, said container containing only said viscous liquid fluid, except for said gap, wherein said viscous fluid has a viscosity of more than or equal to 5 cSt with little fluctuation of viscosity with temperature, whereby a circumferential wave is formed in said viscous fluid during rotation of said spinning body and nutation energy is damped by said centrifugal wave when the centrifugal wave frequency matches the nutation frequency.

9. The nutation damper of claim 8 wherein said viscous fluid has a viscosity of at least 10 cSt.

* * * * *